July 13, 1965 G. TRAUTWEIN 3,195,056

CIRCUIT TO ELIMINATE NOISE PULSES IN PULSE SIGNALS

Filed Sept. 19, 1962 2 Sheets-Sheet 1

INVENTOR

GUSTAV TRAUTWEIN

BY Percy P. Lantzy

ATTORNEY

July 13, 1965 G. TRAUTWEIN 3,195,056

CIRCUIT TO ELIMINATE NOISE PULSES IN PULSE SIGNALS

Filed Sept. 19, 1962 2 Sheets-Sheet 2

INVENTOR
GUSTAV TRAUTWEIN

BY Percy P. Lantzy
ATTORNEY

United States Patent Office 3,195,056
Patented July 13, 1965

3,195,056
CIRCUIT TO ELIMINATE NOISE PULSES IN PULSE SIGNALS

Gustav Trautwein, Pforzheim, Germany, assignor to International Standard Electric Corporation, New York, N.Y., a corporation of Delaware Filed Sept. 19, 1962, Ser. No. 224,765
Claims priority, application Germany, Oct. 4, 1961, St 18,395
11 Claims. (Cl. 328—165)

This invention relates to apparatus employing pulse signals to convey information and more particularly to a circuit arrangement for eliminating interference, such as noise pulses, in such pulse signals.

The circuit of this invention is suitable for use in wire and radio communication receivers, data processing systems, and the like. In systems of this type, especially in remote control systems where information is transmitted by pulse code techniques, there is always the danger that, due to noise pulses (e.g. clicking noises) which are likely to exist in any type of transmission medium, the information is mutilated to such an extent that the remote control receiver is no longer capable of correctly detecting the information.

Another source of information mutilation due to noise is in an electronic remote control receiver controlled by voice- or carrier-frequency telegraph equipment employing a relay contact for keying the remote control receiver. The slightest chatter of the relay contact is sufficient to mutilate the pulse signal to prevent such a receiver from correctly detecting the information content of the pulse signal.

An object of this invention is to provide a circuit to eliminate such pulse signal mutilation.

Another object of this invention is to provide a circuit to eliminate any interference appearing during a predetermined time interval measured from the leading edge of a pulse or space component forming the pulse signal.

A feature of this invention is the provision of means coupled to a source of pulse signal containing interference to produce a composite signal including a predetermined pulse waveform related to the leading and trailing edges of the pulses of the pulse signal, the pulse signal itself and an inverted version of the pulse signal and means coupled to the means to produce responsive to the composite signal to reproduce the pulse signal free of the interference.

Another feature of this invention is the provision of a monostable trigger circuit controlled directly by the input pulse signal containing interference and by a 180° phase inverted version of the input pulse signal to provide a predetermined pulse waveform. The predetermined pulse waveform, differentiated by RC circuits, is combined with the input pulse signal and the phase inverted version of the input pulse signal and coupled by means of diodes to the control electrodes of a bistable trigger circuit. The bistable circuit delivers an output signal which is a reproduction of the input pulse signal but liberated from the interference.

Figure 1:
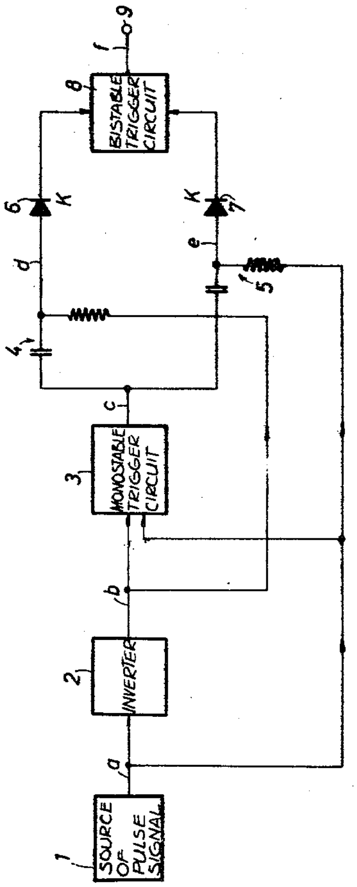
Figure 2:
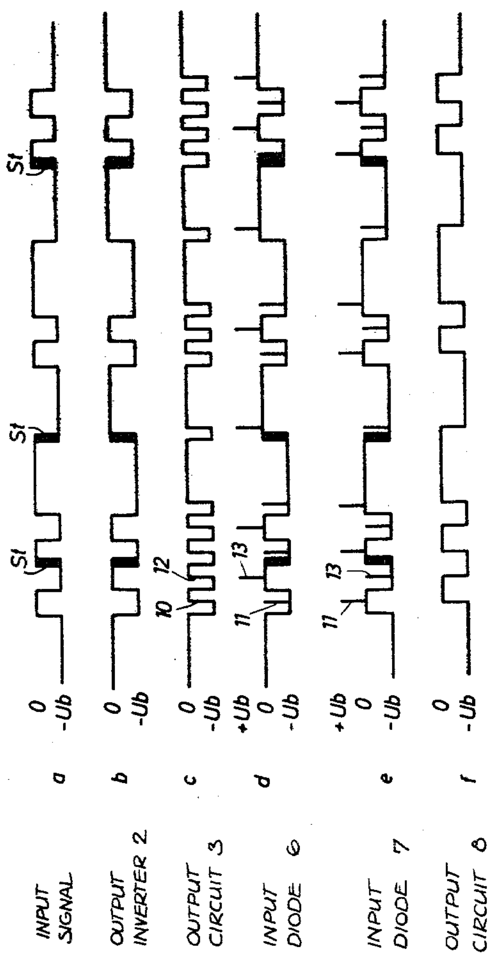

The above-mentioned and other features and objects of this invention will become more apparent by reference to the following description taken in conjunction with the accompanying drawings, in which:

FIG. 1 is a schematic diagram in block form of a circuit arrangement in accordance with the principles of this invention; and FIG. 2 illustrates a series of curves useful in explaining the operation of the circuit of FIG. 1.

Referring to FIG. 1, a pulse signal in the form of a train of pulses as illustrated in curve *a*, FIG. 2, which may be subjected to interferences S*t*, such as noise, is present at the output of source 1. This train of pulses is coupled to inverter 2 and subjected to a 180° phase shift therein. Accordingly, at the output of inverter 2 there will appear a train of pulses as illustrated in curve *b*, FIG. 2. The pulse train output of source 1 and the pulse train output of inverter 2 are coupled to the input of a monostable trigger circuit 3 by means of known decoupling circuits (not shown). Circuit 3 having a reset time of approximately 50% of the duration of one single short pulse of the input pulse train responds to the rising leading edge of the pulses of the pulse train output of source 1 and the rising leading edge of the pulses of the pulse train output of inverter 2. Thus, effectively circuit 3 responds to the rising and the falling edges of the pulses of the pulse train output of source 1 to convert the input pulse train to a predetermined pulse waveform as illustrated in curve *c*, FIG. 2. By the operation of circuit 3, noise pulses or other interferences present in the input pulse train within the reset time are prevented from becoming effective and, thus, effectively eliminated. The output signal of circuit 3 is differentiated in the RC circuits 4 and 5. The differentiated signal of circuit 4 is combined with the output pulse train of inverter 2 resulting in a composite signal as illustrated in curve *d*, FIG. 2 and applied to diode 6. The differentiated signal of circuit 5 is combined with the output pulse train of source 1 resulting in a composite signal as illustrated in curve *e*, FIG. 2 and applied to diode 7. Diodes 6 and 7 couple the positive pulses of the curves *d* and *e*, FIG. 2 (the pulses extending from 0 to +U*b*) to the input electrodes of a bistable trigger circuit 8.

The operation of the circuit of FIG. 1 is as follows. When the input signal of curve *a*, FIG. 2 attains the potential 0, the cathode potential of diode 7 will assume this 0 potential since the signal of curve *a*, FIG. 2 is applied to the anode of diode 7. After half a pulse width, or the predetermined reset time of circuit 3, circuit 3 is reset (note edge 10 of curve *c*, FIG. 2). When differentiated this positive going pulse edge becomes a positive going pulse 11. The positive going pulse 11 is added to the 0 potential of the input signal (note curve *c*, FIG. 2) resulting in a positive pulse being passed through diode 7 to control circuit 8 to assume an output potential of 0. When the input signal of curve *a*, FIG. 2 attains the potential —U*b*, the circuit 3 is controlled by the output signal of inverter 2 which is also applied to the anode of diode 6 causing the cathode of diode 6 to attain the 0 potential. After half a pulse width, or the predetermined reset time of circuit 3, circuit 3 is reset (note edge 12 of curve *c*, FIG. 2). When edge 12 is differentiated a positive going pulse 13 is produced. The pulse 13 is added to the 0 potential of the output signal of inverter 2 (note curve *d*, FIG. 2) resulting in a positive pulse being passed through diode 6 to control circuit 8 to return to its initial position (—U*b*). As may be seen from curve *f*, FIG. 2, circuit 8 delivers to the output 9 a train of pulses having the same pulse sequence as the input train of pulses (curve *a*, FIG. 2), but free from interferences and delayed with respect to the original input train of pulses by an amount equal to the reset time of circuit 3, one half the width of the narrower pulse of the input train of pulses in the example herein employed.

In accordance with the description hereinabove the circuit of this invention to eliminate noise or other interference in a pulse signal comprises a source 1 of pulse signal containing interference; means, including inverter 2, circuit 3 and differentiators 4 and 5, coupled to source 1 to produce a composite signal including a predetermined pulse waveform related to the leading and trailing edges of the pulses of the pulse signal, the pulse signal itself and an inverted version of the pulse signal; and means, including circuit 8, coupled to the means to produce responsive to the composite signal to reproduce the pulse signal free of the interference.

While I have described above the principles of my invention in connection with specific apparatus, it is to be clearly understood that this description is made only by way of example and not as a limitation to the scope of my invention as set forth in the objects thereof and in the accompanying claims.

I claim:

1. A circuit to eliminate noise in a pulse signal comprising:
- a source of pulse signal containing interference;
- first means coupled to said source responsive to said pulse signal and an inverted version of said pulse signal to produce a predetermined waveform;
- second means coupled to said first means to produce a first composite signal including said predetermined waveform and said inverted version of said pulse signal;
- third means coupled to said first means to produce a second composite signal including said predetermined waveform and said pulse signal; and
- fourth means coupled in common to said second and third means responsive to said first and second composite signals to reproduce said pulse signal free of said interference.

2. A circuit to eliminate noise in a pulse signal comprising:
- a source of pulse signal containing interference;
- first means coupled to said source responsive to said pulse signal and an inverted version of said pulse signal to produce a predetermined pulse waveform; and
- second means coupled to said source and said first means responsive to said pulse signal, said inverted version of said pulse signal and said predetermined waveform to reproduce said pulse signal free of said interference.

3. A circuit to eliminate noise in a pulse signal comprising:
- a source of pulse signal containing interference;
- means coupled to said source to invert said pulse signal;
- means coupled to said source and said means to invert to convert said pulse signal into a predetermined pulse waveform; and
- means coupled to said source, said means to invert and said means to convert to reproduce said pulse signal free of said interference.

4. A circuit according to claim 3, wherein said means to convert includes a monostable trigger circuit having a predetermined reset time.

5. A circuit according to claim 3, wherein said means to reproduce includes a bistable trigger circuit .

6. A circuit to eliminate noise in a pulse signal comprising:
- a source of pulse signal containing interference;
- means coupled to said source to invert said pulse signal;
- means coupled to said source and said means to invert to convert said pulse signal into a predetermined pulse waveform;
- first means coupled to said means to convert and said means to invert to combine said predetermined pulse waveform and the inverted version of said pulse signal;
- second means coupled to said means to convert and said source to combine said predetermined pulse waveform and said pulse signal; and
- means coupled in common to said first and second means to reproduce said pulse signal free of said interference.

7. A circuit according to claim 6, wherein said means to convert includes a monostable trigger circuit having a predetermined reset time.

8. A circuit according to claim 6, wherein said means to reproduce includes a bistable trigger circuit.

9. A circuit according to claim 6, wherein said means to convert includes:
- a monostable trigger circuit having a predetermined reset time; and
- a pair of differentiators coupled in parallel to the output of said monostable circuit.

10. A circuit according to claim 9, wherein said first means includes:
- a first diode coupled to one of said differentiators; and said second means includes:
- a second diode coupled to the other of said differentiators.

11. A circuit according to claim 10, wherein said means to reproduce includes a bistable trigger circuit coupled to said first and second diodes.

References Cited by the Examiner

UNITED STATES PATENTS 3,067,343 12/62 Roscoe -------------- 307—88.5

JOHN W. HUCKERT, *Primary Examiner.*

ARTHUR GAUSS, *Examiner.*